United States Patent [19]

Arai

[11] 4,243,233
[45] Jan. 6, 1981

[54] SEAL RING HAVING A TAPERED SURFACE, AND A SEALING DEVICE

[76] Inventor: Yoshio Arai, 1-26-26, Koganehara, Matsudo-shi, Chiba-ken,, Japan

[21] Appl. No.: 9,834

[22] Filed: Feb. 6, 1979

[30] Foreign Application Priority Data

Jun. 12, 1978 [JP] Japan ................... 53/70519

[51] Int. Cl.³ ............................................. F01C 19/08
[52] U.S. Cl. ................... 277/81 P; 418/142
[58] Field of Search ............... 277/168, 170, 171, 217, 277/216, 81 R, 81 P, 96.1; 418/142, 131

[56] References Cited

U.S. PATENT DOCUMENTS

| | | | |
|---|---|---|---|
| 2,989,209 | 6/1961 | Hersman | 277/170 |
| 3,554,564 | 1/1971 | Lassanske | 277/170 |
| 3,554,568 | 1/1971 | Held | 277/170 |

FOREIGN PATENT DOCUMENTS 2225935 12/1973 Fed. Rep. of Germany ........... 418/142

*Primary Examiner*—Robert I. Smith
*Attorney, Agent, or Firm*—Haseltine, Lake & Waters

[57] ABSTRACT

A novel sealing device of extremely simple and durable construction particularly adapted for use in sealing between the opposed flat end surfaces of two mutually movable members, for example, one for a rotary member and the other for a stationary member. The device includes a seal ring of novel construction having a flat sealing face and a tapered, conical sealing face formed on the opposite sides thereof, and an annular groove formed in said rotary member for receiving said seal ring, said groove being provided with a conical bottom surface. The seal ring is cut to provide itself with a radial expanding force. The annular groove has a radial breadth greater than that of said seal ring so that said seal ring is slidable under the action of said radially expanding force along said conical bottom surface of said groove in accordance with a change in the distance between said flat surfaces of said stationary and rotary members or in accordance with the increasing wear on said sealing faces of said seal ring to thereby urge at all times said flat and conical sealing faces in intimate sealing contact with the flat surface of said stationary member and the conical bottom surface of said groove of said rotary member, respectively. The seal ring is cut stepwise to form a pair of circumferential cut surfaces, by intimate contacting engagement of which a tight seal is produced at the cut portion of said seal ring.

4 Claims, 6 Drawing Figures

SEAL RING HAVING A TAPERED SURFACE, AND A SEALING DEVICE

BACKGROUND OF THE INVENTION

The present invention broadly relates to a seal between opposing flat surfaces of two members which make a relative movement to each other and, more particularly, to an annular seal ring having a tapered surface and adapted to be received by an annular groove having a tapered bottom surface formed in either one of these members, as well as to a sealing device incorporating the annular seal ring.

Generally speaking, the seal between the inner peripheral surface of cylinder and the outer peripheral surface of the piston of internal combustion engine is performed by annular seal rings called piston rings which are cut at their intermediate portions. These piston rings, thanks to the provision of the cut portions, exhibit radial expanding force. This radial expanding force acts to press the outer peripheral surface of the piston ring against the inner peripheral surface of the cylinder, so as to enable the piston ring to form a good seal between the inner peripheral surface of the cylinder and the outer peripheral surface of the piston.

This advantage of the conventional piston ring i.e. the radial expansion of the ring however, cannot be utilized in the seal between the inner side surface of the housing and the side surface of the rotor of rotary-piston type internal combustion engine.

It has been a conventional measure, therefore, to obtain the required sealing force between the side surfaces of the rotor and housing, to press a seal ring which itself as no expanding force, against the sealing surface, by means of springs or the like resilient means disposed behind the seal ring.

More specifically, as will be seen from FIG. 1 showing a typical example of conventional sealing arrangement, a seal ring 1 adapted to make a seal between the side surface R of the rotor and the side surface H of the housing is resiliently pressed by springs 2 against the surface H of the housing. In order to ensure a free application of pressure to the surface of the seal ring 1, gaps h and h' are left between the radially inner and outer surfaces, and the opposing walls of the annular groove G for receiving the seal ring 1. As a result, lubricating oil is allowed to leak from the radially inner portion of the rotor to the peripheral portion of the rotor, through these gaps and the clearance behind the seal ring 1 where the springs 2 are disposed.

Various counter-measures have been taken to avoid such a leak of lubricating oil. For instance, it has been proposed to form a groove 3 in the seal ring 1 itself, so as to receive an "O" ring 4 adapted to make a seal between the rotor and the seal ring itself, as shown in FIG. 1. It has been also practiced to use an oil seal 6, in place of the "O" ring 4, as shown in FIG. 2.

These conventional sealing arrangement, however, have following disadvantages. Namely, the seal ring 1 which operates under severe condition of high temperature and pressure, is always made to move in the groove G toward one side of the groove G, as the rotor makes a complicated eccentric rotary movement. As a result, the above mentioned gaps h and h' are made to change, to nullify the above-explained sealing effect. Therefore, the seal ring 1 fails to perform the sealing function, to allow the lubricating oil around the crank shaft, gears and the like at the center of the rotor to leak into the combustion chamber partly defined by the outer peripheral surface of the rotor, through the gaps h, h' and the clearance behind the seal ring 1.

Further, the combustion gas of a high pressure is allowed to leak from the combustion chamber to the low-pressure side, through these gaps and clearance.

These leaks of lubricating oil and combustion gas inconveniently lower the performance of the rotary-piston type internal combustion engine and, further, poses various problems such as deterioration of combustion resulting in uneconomically large rate of fuel consumption and increased emission of noxious components to the atmosphere.

SUMMARY OF THE INVENTION

Under these circumstances, the present invention aims at fundamentally overcoming above stated problem of the prior art.

Thus, it is an object of the invention to provide a seal ring and sealing device for making a seal between two opposing flat surfaces of two members which make a relative movement to each other, in which the seal is performed solely by a seal ring having a tapered surface which is received by an annular groove having a tapered bottom surface and formed in either one of these two sealing surfaces.

It is another object of the invention to provide a seal ring having a tapered surface and a sealing device incorporating the same, in which the seal ring is cut at its intermediate portion, so as to exert an expanding force for compensating reduction of sealing force attributable to an increase of the distance between two sealing surfaces or wear down of the axial end surface of the seal ring making a sliding contact with one of the sealing surfaces.

DESCRIPTION OF THE PREFERRED EMBODIMENTS

Hereinafter, the invention will be more fully described through a preferred embodiment in which the seal ring and the sealing device of the invention are used in making a seal between the side surface of the housing and the side surface of the rotor of a rotary-piston type internal combustion engine.

Figure 1:
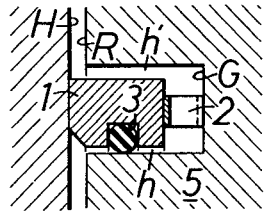
FIGS. 1 and 2 are sectional side-elevational views of conventional sealing devices.
Figure 2:
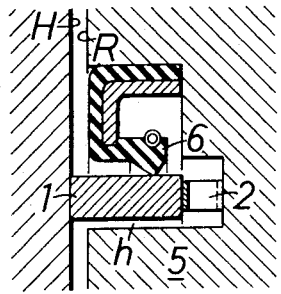
Figure 3:
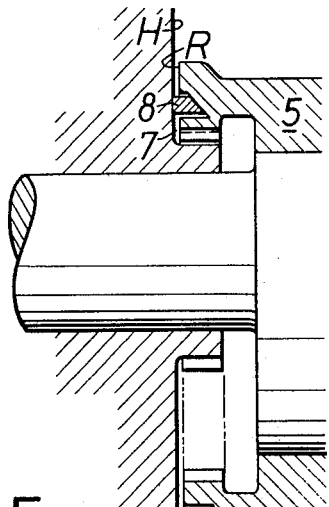
FIG. 3 is a sectional side elevational view of a sealing device constructed in accordance with an embodiment of the invention.
Figure 4:
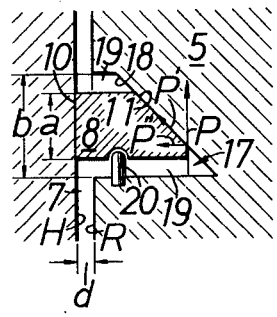
FIG. 4 is an enlarged view of a portion of the sealing device as shown in FIG. 3.
Figure 5:
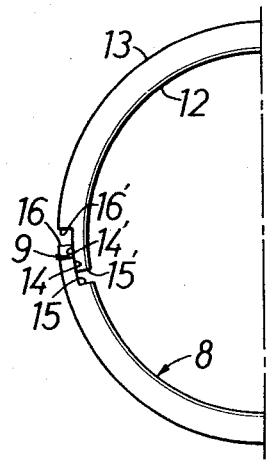
FIG. 5 is a side elevational view of a seal ring as shown in FIG. 3 having a tapered surface.

Referring to FIGS. 3 and 4, there are shown a side surface H of the housing and a side surface R of the rotor 5 of a rotary-piston type internal combustion engine. A sealing device embodying the invention is disposed in a small gap formed between these two side surfaces H and R. The sealing device has a seal ring 8 provided at its one axial end with a flat sealing surface 10 and, at its other axial end, with an annular male tapered sealing surface 11, which is received by an annular groove 17 formed in the rotor side surface R and provided with an annular female tapered bottom surface 18.

The flat sealing surface 10 and the tapered sealing surface 11 are kept in contact with the side surface H of the housing and the female tapered bottom surface 18 of the annular groove 17, respectively, thereby to provide a gas-tight seal between the radially inner and outer sides of the seal ring 8.

Figure 6:
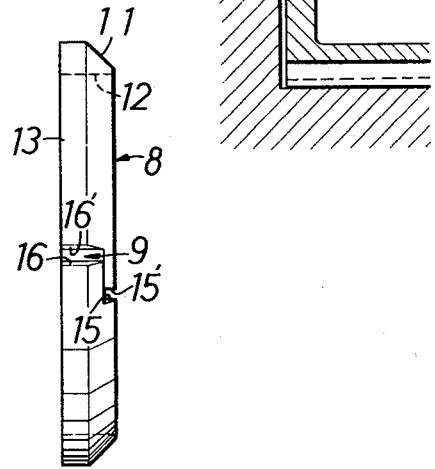
FIG. 6 is an enlarged front elevational view of the seal ring as shown in FIG. 5 having a tapered surface, showing the state of cut portion of the seal ring.

To explain in more detail the construction of the seal ring 8, the seal ring 8 is an annular body having a radial width a and cut at an intermediate portion as at 9. The aforementioned flat sealing surface 10 is formed at one axial end of the seal ring 8, while the aforementioned tapered sealing surface 11 is formed at the other axial end of the same. More specifically, the sealing surface 11 is a conical male tapered surface which diverges in the radial direction toward the flat sealing surface 10. The male tapered surface 11 is inclined at an angle of, for example, 45° to the flat sealing surface 10. The cut end of the cut portion 9 of the seal ring 8 has a stepped form constituted by circumferential and radial lines of cutting, as will be most clearly seen from FIG. 6. Namely, the cut portion 9 of the seal ring has circumferential cut surfaces 14,14' which extend substantially along the widthwise bisector between the inner and outer peripheral surfaces 12,13 of the seal ring 8 concentrically with the latter, and radial cut surfaces 15, 15':16,16' which extend from the circumferential cut surfaces 14,14' to respective peripheral surfaces of the seal ring 8. The circumferential cut surfaces 14,14' are overlapped in a slidable manner. Consequently, the seal ring 8 inherently has a radial expanding force.

Referring now to the annular groove 17 formed in the side surface R of the rotor and adapted for receiving the seal ring 8, the radial breadth b of this annular groove 17 is selected to be greater than the radial width a of the seal ring 8, so that the seal ring 8 may move in the annular groove 17, keeping the sealing contact with the side surface H of the housing and the bottom of the groove 17, as the distance between the side surfaces H and R of the housing and rotor is changed. The bottom surface of the annular groove 17 is formed as a female tapered surface 18 which expands radially outwardly toward the side surface R of the rotor. The female tapered surface 18 forms an angle of, for example, 45° to the side surface R of the rotor.

In use, the seal ring 8 is fitted into the annular groove 17, so as to separate the radially outer and inner portions of the space in the annular groove 17, as shown in FIGS. 3 and 4. As a result, the flat sealing surface 10 of the seal ring 8 makes a sliding and sealing contact with the side surface H of the housing, while the male tapered surface 11 makes a sliding and sealing contact with the female tapered surface 18 of the annular groove 17, as the rotor makes a rotation relatively to the housing.

The radial expanding force P of the seal ring 8 then produces a component P' of force which acts to make the seal ring 8 slide along the female tapered surface 18. This component P' in turn produces a component P'' which tends to press the seal ring 8 axially against the side surface H of the housing.

Therefore, by providing a radial clearance 19 between the seal ring 8 and the wall of the annular groove 17, so as to accomodate the radially outward displacement of the seal ring 8, as shown in FIG. 4, the flat sealing surface 10 and the male tapered sealing surface 11 of the seal ring are automatically pressed into sealing contact with the side surface H of the housing and the female tapered surface 18 of the annular groove 17.

Consequently, a good seal is formed between the side surfaces H,R of the housing and rotor, at each axial end of the seal ring 8, i.e. at the flat sealing surface 10 and the male tapered surface 11. This sealing effect is never deteriorated, even when the distance d between the side surfaces H and R is changed, because the seal ring 8 slides along the female tapered surface 18, so as to accomodate such a change of distance d. In addition, various centrifugal forces applied to the seal ring 8 due to the eccentric rotation of the rotor 5 enhances the pressure at which the seal ring 8 contacts the female tapered surface 18 of the annular groove 17, which in turn increases the contact pressure of the seal ring 8 on the side surface H of the housing, thereby to further improve the sealing effect.

As shown in FIG. 4, it is possible to prevent the seal ring 8 from rotating in the annular groove 17 relatively to the rotor 5, due to a frictional torque acting between the side surface H of the housing and the seal ring 8, by providing an anti-rotation pin 20 as shown in FIG. 4.

Although the invention has been described with specific reference to an embodiment applied to a seal between the rotor and the housing of a rotary-piston type internal combustion engine, it will be clear to those skilled in the art that the sealing device of the invention can be applied broadly to the end-surface sealing of various machines such as rotary compressor, rotary pump and the like, and to other general end-surface sealing purposes.

Not only metals such as cast iron but also various materials such as ceramics, synthetic rubbers, carbon, plastics and so forth can effectively used as the material of the seal ring 8.

Preferably, various conventional surface treatments are effected on the sealing surfaces of the seal ring of the invention, in order to improve anti-scuffing, anti-seizure and wear-resistant properties, as well as to enhance the running-in characteristic, anti-corrosion effect and oil-holding nature of the seal ring, as in the conventional piston ring.

As has been described, according to the invention, an effective and reliable seal is formed between the radially outer part and the radially inner part of the space formed between opposing surfaces of two relatively moving members, by a seal ring having an inclined axial end surface. It is remarkable that this superior sealing effect is provided solely by the seal ring having tapered end surface, so that "O" ring or the like assisting means is completely eliminated. This in turn ensures a simplified construction and easier handling of the sealing device, as well as improved durability which promises the excellent sealing effect to be maintained for longer period of time.

Further, since the seal ring is allowed to slide along the tapered surface of the annular groove, so as to accommodate or compensate for the change in the distance between the opposing surfaces of the relatively moving two members, the sealing effect is never deteriorated by such a change in distance.

What is claimed is:

1. A sealing device adapted to form a seal between the opposing flat surfaces of a stationary member and a rotary member, said device comprising an annular groove formed in said rotary member and having a conical bottom surface spreading radially outwardly toward the flat surface of said rotary member, an annular seal ring accommodated in said annular groove, said seal ring having a flat sealing face formed at one end thereof for sealing engagement with said flat surface of said stationary member, and a conical sealing face formed at the other end thereof for sealing engagement with said conical bottom surface of said groove, said seal ring being cut so as to have a radially expanding force, said groove having a radial breadth greater than that of said seal ring, whereby said seal ring is slidable under the action of said radial expanding force along said conical bottom surface of said groove in accordance with a change in the distance between said flat surfaces of said stationary and rotary members or with the increasing wear on said sealing faces of said seal ring to thereby urge at all times said flat and conical sealing faces in intimate sealing contact with the flat surface of said stationary member and the conical bottom surface of said groove of said rotary member, respectively.

2. A sealing device as claimed in claim 1, in which said seal ring is cut in a stepwise fashion to form a pair of opposed circumferential cut surfaces extending substantially along the widthwise bisector between the inner and outer peripheral surfaces of said seal ring in concentric relation therewith, and two pairs of radial cut surfaces extending in radially opposite directions from respective circumferential ends of each of said circumferential cut surfaces to the respective outer and inner peripheral surfaces of said seal ring, said circumferential cut surfaces being arranged for slidable overlapping relation with each other so as to seal the cut portion of said seal ring by mutual intimate contact thereof.

3. A sealing device as claimed in claim 1, wherein said flat surface of said rotary member is a side surface of the rotor of a rotary-piston type internal combustion engine, while said flat surface of said stationary member is a corresponding side surface of the housing of said rotary-piston type internal combustion engine.

4. A sealing device as claimed in claim 1, wherein said seal ring is prevented by an anti-rotation member from rotating in said annular groove relative to said rotary member.

* * * * *